(12) United States Patent
Anjum et al.

(10) Patent No.: US 9,046,595 B2
(45) Date of Patent: Jun. 2, 2015

(54) CLIENT ASSISTED LOCATION DATA ACQUISITION SCHEME

(75) Inventors: Farooq Anjum, Somerset, NJ (US);
Byungsuk Kim, Kyunggi-do (KR);
Santosh Pandey, Auburn, AL (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 11/514,312

(22) Filed: Sep. 1, 2006

(65) Prior Publication Data

US 2007/0087761 A1    Apr. 19, 2007

Related U.S. Application Data

(60) Provisional application No. 60/712,819, filed on Sep. 1, 2005.

(51) Int. Cl.
*H04W 72/00* (2009.01)
*G01S 5/02* (2010.01)
*H04W 64/00* (2009.01)

(52) U.S. Cl.
CPC ............. *G01S 5/0252* (2013.01); *H04W 64/00* (2013.01)

(58) Field of Classification Search
CPC .............................. H04W 64/00; H04W 84/12
USPC ............................................ 455/456.2, 115.3
See application file for complete search history.

(56) References Cited

U.S. PATENT DOCUMENTS

| | | | |
|---|---|---|---|
| 7,127,258 B2* | 10/2006 | Zegelin | 455/456.1 |
| 2004/0095276 A1* | 5/2004 | Krumm et al. | 342/465 |
| 2004/0140931 A1* | 7/2004 | Vesuna | 342/451 |
| 2004/0203904 A1* | 10/2004 | Gwon et al. | 455/456.1 |
| 2005/0014497 A1* | 1/2005 | Goren | 455/423 |
| 2005/0136972 A1* | 6/2005 | Smith et al. | 455/554.1 |
| 2005/0176442 A1* | 8/2005 | Ju et al. | 455/456.1 |
| 2005/0195768 A1* | 9/2005 | Petite et al. | 370/335 |
| 2005/0233748 A1* | 10/2005 | Robinson et al. | 455/440 |
| 2006/0200862 A1* | 9/2006 | Olson et al. | 726/23 |
| 2006/0211376 A1* | 9/2006 | Bhattacharya et al. | 455/67.11 |
| 2007/0081488 A1* | 4/2007 | Adya et al. | 370/328 |
| 2008/0051103 A1* | 2/2008 | Goren et al. | 455/456.1 |
| 2008/0221836 A1* | 9/2008 | Tateson | 702/188 |

(Continued)

FOREIGN PATENT DOCUMENTS

DE    10142951 A1    4/2003
JP    10-327468 A    12/1998

(Continued)

OTHER PUBLICATIONS

International Search Report dated Sep. 2, 2007 in International Application No. PCT/US2006/034213.

(Continued)

*Primary Examiner* — Allahyar Kasraian
(74) *Attorney, Agent, or Firm* — Banner & Witcoff, Ltd.

(57) ABSTRACT

A system and method for locating a wireless client using trusted wireless detectors is described. Sniffers may sense signal strength information and transmit the information to a database. The database may store signal strength-based location information. Information from the database may then be used to determine the location of a wireless client based on new signal strength information from one or more sniffers.

5 Claims, 12 Drawing Sheets

(56) References Cited

U.S. PATENT DOCUMENTS

2008/0299995 A1* 12/2008 Spain .................... 455/456.6
2009/0017841 A1* 1/2009 Lewis et al. ............ 455/456.5

FOREIGN PATENT DOCUMENTS

| JP | 2000-261848 | 9/2000 |
|---|---|---|
| JP | 2005-023926 | 1/2005 |
| JP | 2005-321693 | 11/2005 |

OTHER PUBLICATIONS

Written Opinion of the International Searching Authority in International Application No. PCT/US2006/034213.
Krizman, Kevin J., "Wireless Positing Location: Fundamentals, Implementation Strategies, and Sources of Error," Vehicular Technology Conference, 1997, IEEE 47th Phoenix, AZ, USA May 4-7, 1997, New York, NY,USA, IEEE vol. 2, May 4, 1997.
Notification Concerning Transmittal of International Preliminary Report on Patentability mailed Mar. 13, 2008 in International Application No. PCT/US2006/034213.
Tao, P. et al.,"Wireless LAN Location-Sensing for Security Applications," WiSE '03, Sep. 19, 2003, San Diego, CA, 10 pages.
Bahl, P., et al., "Enhancements to the RADAR User Location and Tracking System," Technical Report MSR-TR-200—Feb. 12, 2000, Redmond, WA, pp. 1-13.
Ladd, A., et al., "On the Feasibility of Using Wireless Ethernet for Indoor Localization," *IEEE Transactions on Robotics and Automation*, vol. 20, No. 3, Jun. 2004, pp. 555-559.
Want, R., et al., "The Active Badge Location System", Olivetti Research Ltd, (ORL), Cambridge, England, vo. 10, No. 1, pp. 91-102, Jan. 1992.
Haeberlen, A., et al., "Practical Robust Localization Over Large-Scale 802.11 Wireless Networks," MobiCom '04, Sep. 26-Oct. 1, 2004, Philadelphia, PA, 15 pages.
Krishnan, P., et al., "A System for LEASE: Location Estimation Assisted by Stationary Emitters for Indoor RF Wireless Networks," Proceedings of IEEE Infocom 2004, Hong Kong, Mar. 2004.
Priyantha, N., et al., "The Cricket Location-Support System," $6^{th}$ ACM International Conference on Mobile Computing and Networking (ACM MOBICOM), Boston MA, Aug. 2000, 12 pages.
Gwon, Y., et al., "Robust Indoor Location Estimation of Stationary and Mobile Users," IEEE *Infocom*, 2004, pp. 1-12.
Ganu, S, et al., "Infrastructure-based Location Estimation in WLAN Networks," IEEE Wireless Communications and Networking Conference (WCNC 2004), vol. pp. 465-470, Mar. 2004.
Bahl, P., et al., "RADAR: An In-Building RF-based User Location and Tracking System," *Infocom* 2000, Tel-Aviv, Israel, Mar. 2000, vol. 2, pp. 775-784.
European Office Action dated May 11, 2009 in Application No. 06790139.7.
Canadian Office Action dated Apr. 15, 2014 in Application No. 2,621,133.

* cited by examiner

CLIENT ASSISTED LOCATION DATA ACQUISITION SCHEME

RELATED APPLICATION INFORMATION

This application claims priority to U.S. Ser. No. 60/712,819, filed Sep. 1, 2005, whose contents are expressly incorporated herein by reference.

TECHNICAL FIELD

Aspects of the present invention relate to wireless communication systems. More particularly, aspects of the present invention relate to location data acquisition of mobile terminals.

DESCRIPTION OF RELATED ART

Knowing the location of a wireless user can be useful for both the wireless user and network infrastructure supporting the wireless user. For instance, a user may receive directional guidance once the user knows its location. Also, other entities (for example, businesses and other commercial entities) may provide coupons or other incentives for users based on the user's current location. Further, the underlying network or networks may better allocate services to the user once the user's location is known. Conventional techniques require consistent network infrastructures, all having similar setups. For instance, conventional location techniques may require a wireless device to be using a specific protocol and connecting to a specific network to enable the wireless device's location to be determined.

However, locating wireless users in heterogeneous environments is difficult. Often, interference from entities (active or passive) limits the number of homogenous signals that may be received by the wireless device or limits the number of devices that may detect signals from the wireless device. The limited number of resources makes determining the mobile terminal's location difficult. While a network may realize that a mobile terminal is within the network's coverage area, the network may not be able to determine the mobile terminal's actual position.

BRIEF SUMMARY

Aspects of the invention address one or more problems described above, thereby providing improved network performance. Aspects of the invention locate a mobile terminal by using trusted clients that can report signal strength from a mobile terminal to a position monitoring system. The position monitoring system may then determine the location of the mobile terminal based on the information from the trusted clients. These and other aspects are explained in detail below.

BRIEF DESCRIPTION OF THE DRAWINGS

Aspects of the present invention are illustrated by way of example and not limited in the accompanying figures in which like reference numerals indicate similar elements.

DETAILED DESCRIPTION

Figure 1:
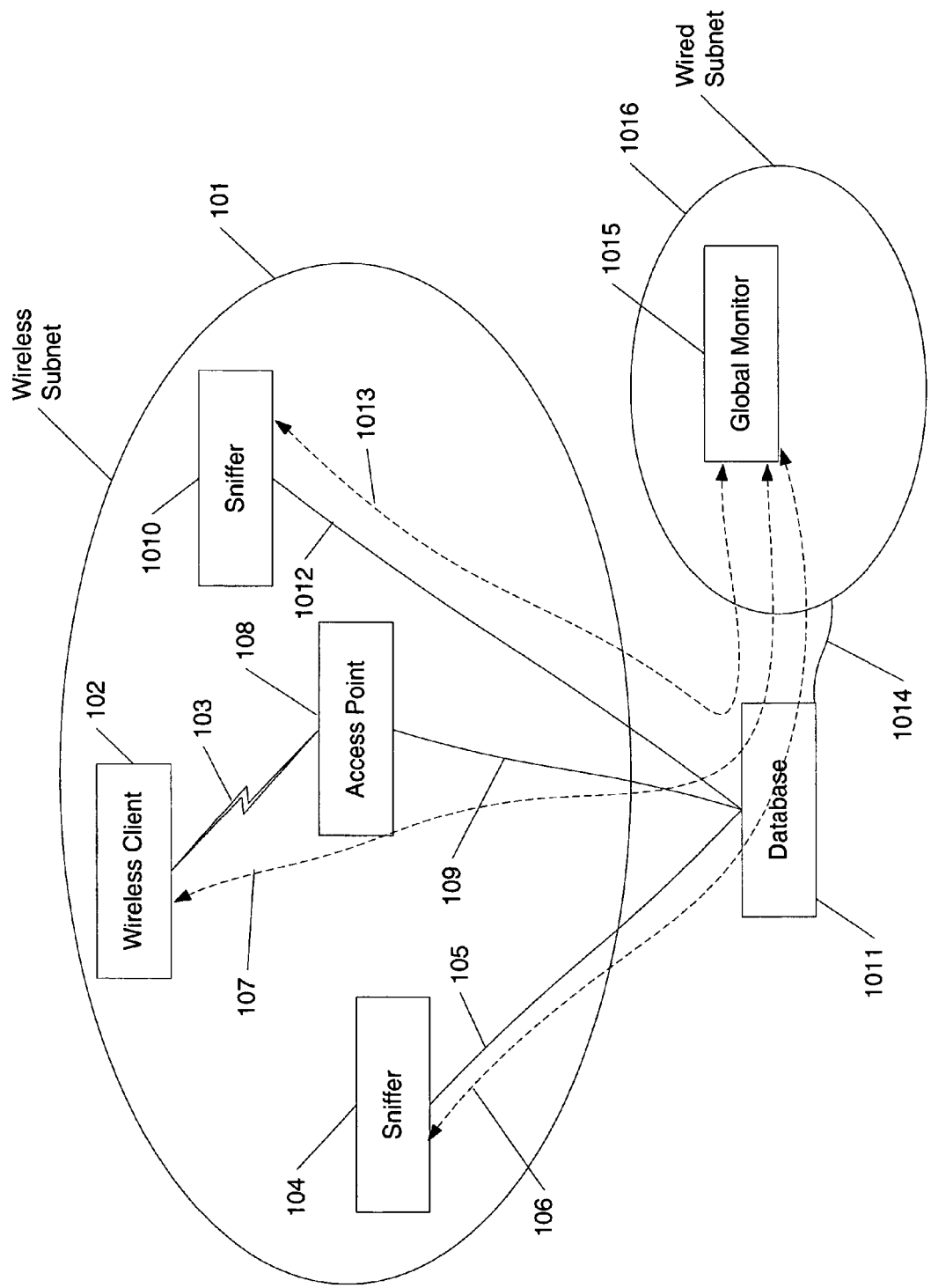
FIG. 1 shows a wireless client in a wireless subnet and a global monitor in a wired subnet in accordance with aspects of the present invention.

Aspects of the present invention relate to systems and methods that monitor and transmit on multiple channels according to network usage. By using one or more of the approaches described below, network handling of packets may be improved. For instance, at least one of packet throughput and packet delay may be improved.

It is noted that various connections are set forth between elements in the following description. It is noted that these connections in general and, unless specified otherwise, may be direct or indirect and that this specification is not intended to be limiting in this respect.

The tedious task of collecting and updating signal strength data required for location estimation is solved using trusted wireless clients. In addition, aspects of the present invention also address the problem in localization on account of the time varying nature of the wireless signals.

Previous location estimation schemes have been realized using various wireless technologies including ultrasound, infrared, Bluetooth, and 802.11 RF networks.

Usually, for the location estimation schemes described in literature, the signal strength SS is collected at many locations throughout the site during the 'training' or 'off-line' phase. A lookup table comprising of the location information along with the signal strengths associated with that location is then built. The lookup table is later used to estimate the SS for the whole site, thenceforth defining a radio map of the site. The location of any client can be estimated using this radio map, based on current SS measurements and various estimation techniques during the 'real-time' or 'on-line' phase.

In accordance with aspects of the present invention, the wireless clients are located based on the 802.11 RF signal strength. Previous approaches to location estimation for 802.11 networks concentrated on the various schemes employed in building the lookup table during the training phase using only 802.11 RF technology.

In some approaches, data was collected at approximately 5 ft intervals for a 10,500 sq. ft. area and a similar methodology was used for building the lookup table in other approaches where data was collected at an average distance interval of 3 ft and 5 ft, respectively.

In yet other approaches, the lookup table was built for cells average cell size was 265.1 sq. ft. rather than for specific locations. The time required to build the lookup table to cover an area of 135,178 sq. ft was 28 man-hours. 512 cells, 2.7 minute per cell. However, a minimum of one minute per cell was recommended for data collection, reducing the total time for data collection to be around 14 man-hours. This work approached location determination by collecting the signal strength data only once for the entire site and then compensating for the time varying effects by calibrating this data using few current data values.

In some approaches, a radio map may be built by data collection and by using an indoor RF signal propagation model.

In yet other approaches, collection of data is proposed using 'stationary emitters'. 'Stationary emitters' can be described as standard, inexpensive wireless transmitters that send a few packets periodically. The results presented were with 12, 28 and 38 'stationary emitters' for 32,400 sq. ft.

In yet other approaches, a location estimation scheme for security application is described.

Using a different technology for localization in 802.11 network, including ultrasound, infrared, and Bluetooth would require additional hardware and hence are not cost efficient. Also, infrared has many drawbacks since it is restricted to line of sight and is affected by sunlight.

In some known approaches, data is collected manually at frequent distance intervals. The immensity of this task makes it impractical for large-scale deployment, especially enterprise networks spanning multiple buildings. Moreover, the data has to be recollected in the event of radio propagation environment changes such as modification to the building structure, network reconfiguration, etc.

Radar-based approaches, the radio map built by using the propagation model was found to be less accurate. This indicates that although modeling the indoor environment to build the radio map may be less tedious, it could be at the expense of a greater error in location estimates.

In yet other approaches, additional hardware called 'stationary emitters' would be needed. Apart from the cost associated with the purchase of such devices, installation issues such as placement and power supply need to be considered for large scale deployment.

The data for location estimation can be collected more efficiently, using trusted clients connected to the network, without any additional hardware requirements. FIG. 1 shows the setup considered for this work. Generally the deployment of wireless network consist of wireless subnet 101 in which the wireless clients 102 are connected to the wired network 1016 over the radio through Access Points AP 108 and routers 1011. This work assumes that the location estimation is done by the network using wireless sniffers 104, 1010. The sniffers 104, 1010 should be able to monitor the surrounding wireless environment for all 802.11 packets and passively record the signal strength of packets originating from the wireless clients 102 in the vicinity. For example, a sniffer may be a laptop with multiple wireless cards which read all arriving 802.11a/b/g packets. Also, by reading the 802.11 packet, it can determine the wireless client 102 which transmitted the packet and hence map the signal strength of the received packet to a wireless client 102.

Alternatively, the sniffers may be dedicated clients that are located at known locations. The known locations may be determined by connection to other dedicated or non-dedicated wireless clients or located through other locating approaches including but not limited to GPS, signal strength, IR, Bluetooth, shortwave, 802.11-family of signals and the like.

The Global Monitor GM 1015 may be any computer connected to the sniffers through the backbone wired network 1016. The GM 1015 controls all the sniffers and maintains the location database 201 to record the data obtained through sniffers 104, 1010 and clients 102. Logical links 106, 107, 1013 are shown to indicate the connection of the GM 1015 to the sniffers 104, 1010 and wireless clients 102. The wireless link 103 and wired physical links 105, 109, 1012, and 1014 are shown connecting to different entities (access point 108, database 1011, and wired subnet 1016.

For the client based data collection scheme, wireless clients 102 may have an application program, called 'client agent' 305 installed on their wireless devices. It may be installed along with other software, like a VPN, for instance, that are essential in an enterprise environment. The client agent 305 allows the users to determine their location when requested by the GM 1015. Location estimation can be improved by using the AP 108 signal strengths sensed by the client 102. The client agent 305 may be modified to incorporate this functionality and report the AP 108 signal strengths along with its location to the GM 1015. Additionally, when the GM 1015 notices a client 102 accessing the wireless network 101 from a restricted area, it may 1) use the client agent 305 to notify the user and disconnect him/her from the network or 2) inform an external security management system such as deployed Wireless Intrusion Detection System WIDS to isolate the user from the network access. The restricted areas could include for example, outside the building, access restricted locations, etc.

Figure 2:
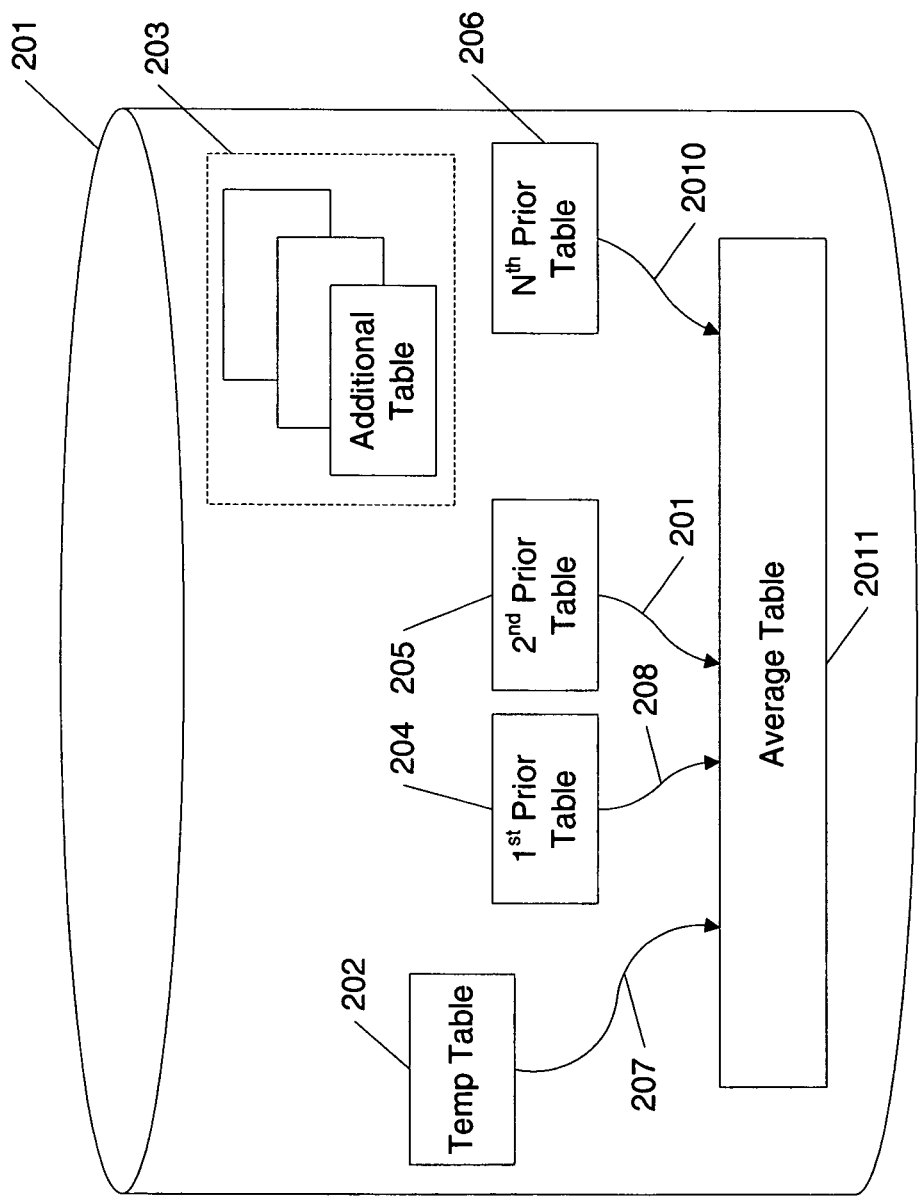
FIG. 2 shows a database in accordance with aspects of the present invention.

The database 201, shown in the FIG. 2, is maintained by the GM 1015 and may reside on the GM 1015 itself or may be elsewhere. The tables 202, 203, 204, 205, 206, 2011 in the database are designated as temp table 202, prior tables 204, 205, 206, and average table 2011. The table entries are location vectors, consisting of the client signal strength readings sensed by the sniffers 104, 1010 and the corresponding location information. A location monitored by 'm' distinct sniffers would have a location vector <locationID; SS1; . . . ; SSm>, where location ID is the tag associated with the location or its coordinates on the floor plan and SSi is client SS sensed by sniffer 'i'.

The temp table 202 may include location vectors built using client assisted data collection method during a single iteration. The location vectors are dynamically built as the clients 102 from various locations respond. The data may be collected during a certain time window, for example, a day.

The prior tables 204, 205, 206 are 'n' separate tables which contain data from 'n' previous iterations. After the temp table 202 is complete or after the time window has elapsed, the oldest table of the prior tables 204, 205, 206 is replaced with the newly formed temp table 202.

The average table 2011 consists of the averages of the various location vectors. Each location vector is obtained through an averaging of the corresponding location vectors in each of the 'n' prior tables 204, 205, 206 and the temp table 202.

The average values can obtained through simple arithmetic averaging or through weighted averaging using appropriate weighting function.

The information for the tables may be continually fed from the sniffers or may be sent periodically (once a day), or may be sent only when polled from the database 201 or other polling device, for instance. Other intervals are of course possible and may be used.

Additional tables 203 may be used to accommodate new parameters that are required to improve location estimation. For example, to implement location based access, a table defining privileges of a user group at a location may be built.

Client assisted data collection scheme is proposed as an efficient data collection scheme that acquires reference points with the help of trusted clients such as company employees.

Figure 3A:
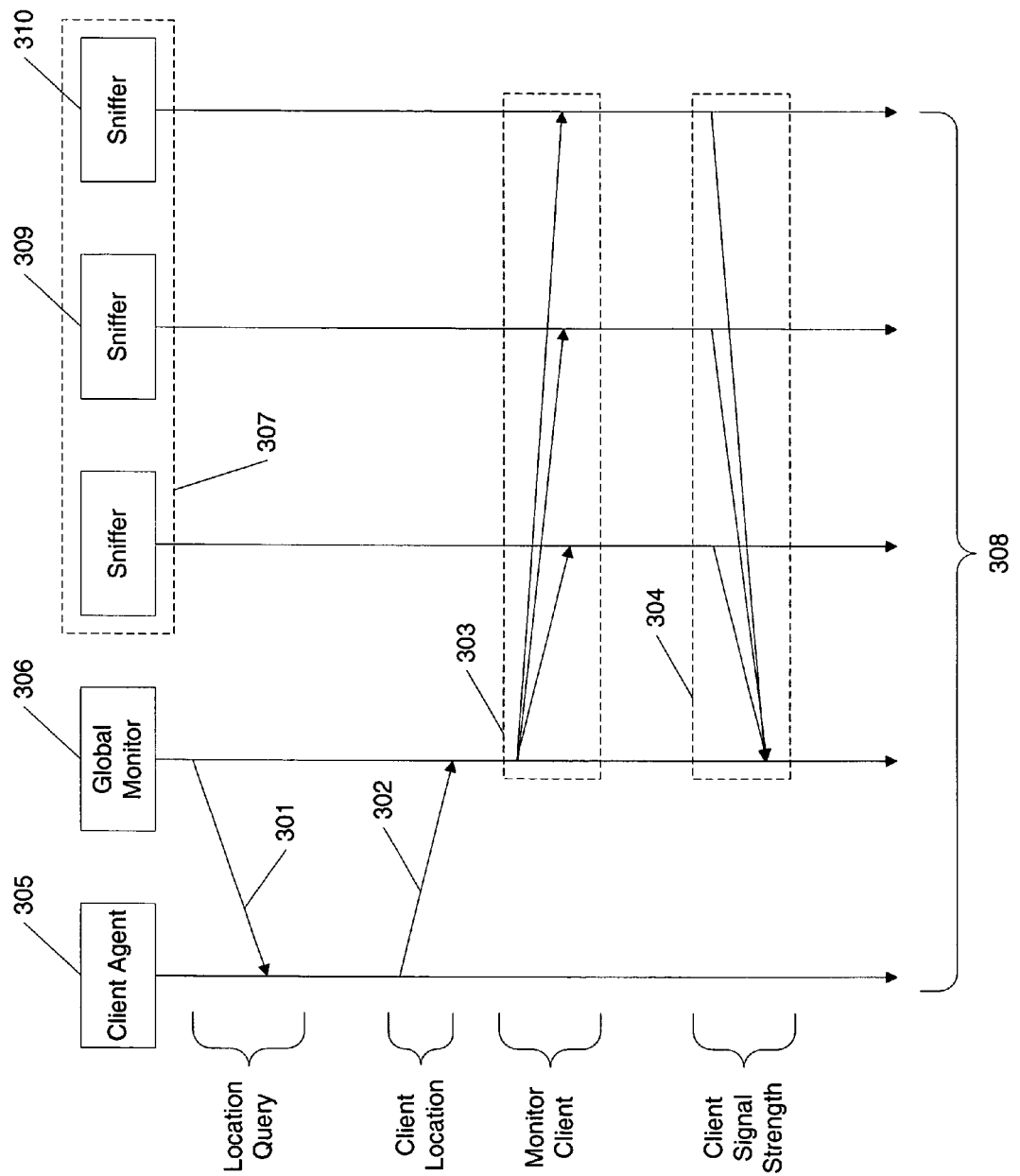
FIGS. 3A and 3B show data collecting processes in accordance with aspects of the present invention.

The data collection process to build a lookup vector is shown in FIG. 3A over a timeline 308. The GM 306, 1015 initiates the process by querying 301 the clients 102 for their location, using the client agent 305. The user may be asked to enter the room number in which the user is currently present or to click on its location on the floor plan brought up by the agent 305. When a client 102 responds, the client agent 305 notifies 302 the GM 306, 1015 with the client's location. The GM 306, 1015 then requests 303 the sniffers 307, 104, 1010 to start monitoring the client 102's signal strength. The data collection process for a given location is completed within a minute and the clients are assumed to be stationary for that duration. After the client signal strength is recorded by the sniffers 307, 104, 1010, the reading is reported 304 back to GM 306, 1015. The GM 306, 1015 now builds the location vector based on the location provided by the client 102 and the signal strength recorded by the sniffers 307, 104, 1010. The location vectors from various locations are then stored in the temp table 202. When the temp table 202 is complete or if the time window has elapsed, the prior tables 204, 205, 206 are updated using the temp table 202. An average table 2011 is then built by averaging corresponding location vectors in each of the 'n' prior tables 204, 205, 206.

Figure 3B:
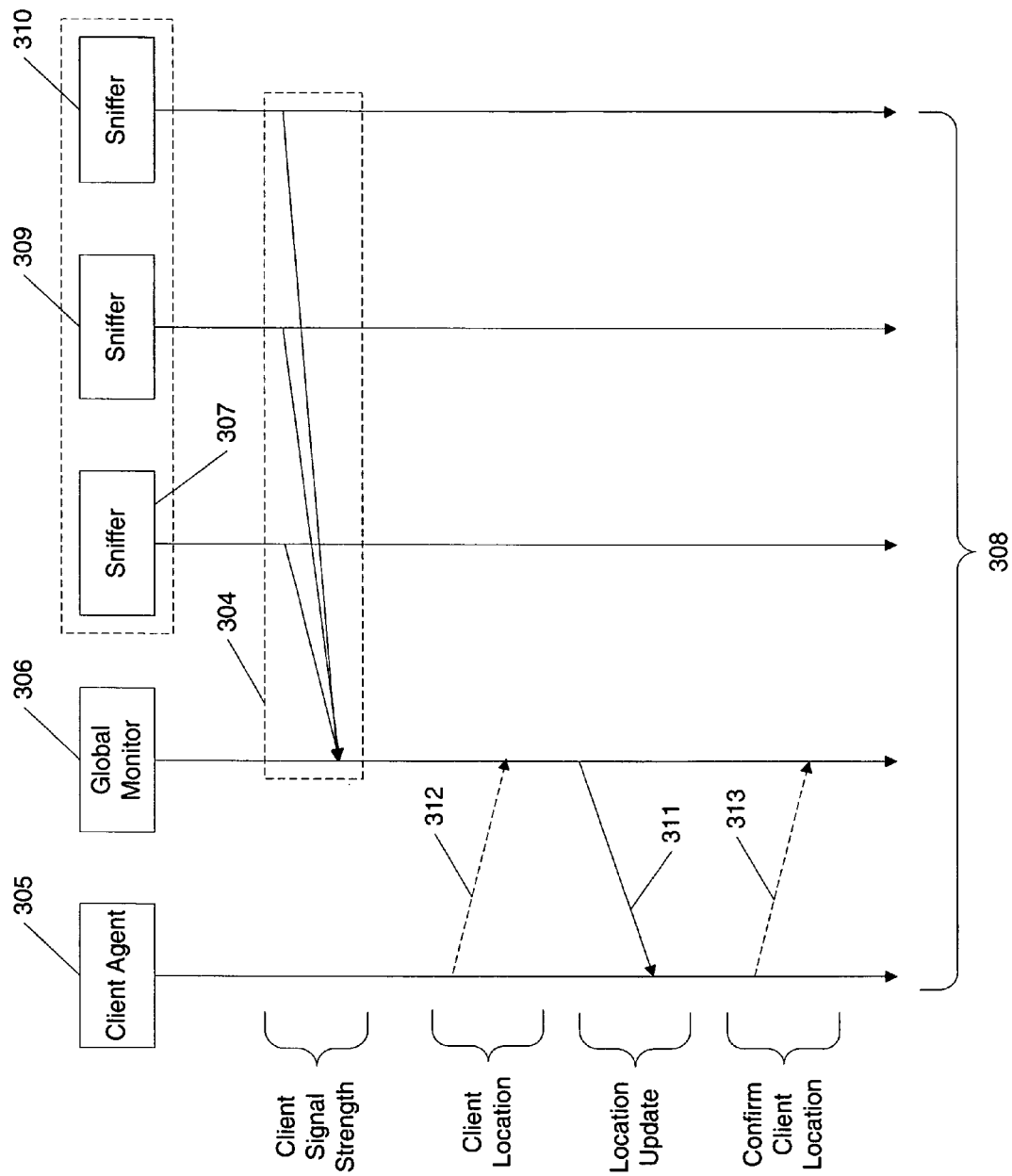

FIG. 3B shows an alternative approach for gathering location information. Here, the sniffers 307-310 communicate signal strength information to global monitor 306 as shown in step 304. Next, the global monitor 306 may provide this information to the client agent 305 in step 311.

Optionally, the client may attempt to provide its own location to the global monitor 306 in step 312 (if possible or if known). Also, the client may optionally attempt to confirm its location, correct its location information, or otherwise acknowledge the location information from the global monitor in step 313.

The global monitor may periodically provide the location information of the client to the client periodically. Alternatively, the global monitor 306 may provide the location information only when requested by the client. Further, the global monitor 306 may provide the client's location information to other entities as well (including businesses, network service providers, companies that may have an interest in the location of the wireless client, and the like).

It is appreciated that the global monitor 306 may be a single entity or multiple entities. It may serve various types of wireless clients based on various criteria including the issuer or service provider of the wireless client, a billing entity, predefined arrangements, and the like.

Some clients 102 may not respond or some locations may not be covered during a given iteration resulting in a partially filled table. The GM 306, 1015 may query only clients that are authenticated by the network or may seek to verify the authentication of a client during the location query 301. Some location responses 302 may be discarded by the GM 306, 1015 if the client does not satisfy the security criteria. The location vectors absent are simply ignored while building the average table 2011. It is found that the effect of incomplete tables is mitigated by using lookup table average over different lookup tables stored in the prior tables 204, 205, 206.

It should be pointed out that this work could be extended to network based location estimation using signal strength readings of a wireless client from AP 108 instead of sniffers 104, 1010. Further, it could also be applied to location estimation schemes implemented at the client 102, based on the signal strength reading of available Access Points 108 located at different locations.

The data collection scheme to collect location data, using the reliable clients connected to the network, differs from the prior solutions proposed in this area.

Prior solutions collect location data either manually, or deploy additional hardware. The scheme described in this work, can be deployed over existing network using the client agent 305 program and the Global Monitor 1015.

The data collection process described herein is made more efficient. In addition, the schemes in accordance with aspects of the present invention addressee the time varying nature of wireless signals.

The area concentrated by many researches is location estimation scheme. The location lookup table data is usually collected to test this scheme and is hence done manually.

Collecting data from the same entity whose location is to be estimated is difficult to conceive. Some researchers have proposed to have beacons distributed over site in order to automate the data collection process. However, this scheme requires additional hardware deployment.

As enterprise environment is considered in this work, it is assumed that the clients the employees would co-operate. However, this assumption may not be always true for other scenarios such as hotspots.

The data for the lookup tables were collected on six different days at 30 different locations. For each day, the location estimation was carried out on-line phase after the lookup table was built training phase. This data collected to estimate the location is called verification data and was collected separately, at the same locations as the ones used to build the lookup tables, but at a different time of the day.

Here, estimation is employed to evaluate the performance of a client assisted data collection scheme. Hence the basic triangulation technique was used to estimate location. However, sophisticated estimation techniques may be applied to obtain better results. Verification data readings were compared with the location vectors in the lookup table and for a given verification reading, the location from the lookup table corresponding to the least Mean Square Error MSE is chosen as the estimated location.

In order to increase the estimation accuracy, some acceptable distance error is introduced while estimation. The lookup table entry corresponding to the second lowest MSE is now used to estimate the location. If the second lowest MSE estimate is a neighbor of the least MSE estimate then the estimated location is at the midpoint of the two estimates. A neighbor of a location is any other location in the lookup table which is physically adjacent to it. Each location may have a different number of neighbors and this information is stored in the database as an additional table 203.

The estimated location region depends upon the distance between neighbors. Here, the distance between neighbors is about 20 ft and hence the range of the estimated region is about 10 ft around the corresponding estimated location. The percentage of correct estimates using this scheme, are tabulated in the Table I.

The locations from a single day's verification data are estimated using the lookup tables built on different days. The result is tabulated in Table I. The table shows the percentage of correct estimates within the verification data when different lookup tables were used. For example, when the lookup table of Day 2 was used for the verification data from Day 1, 81.25% of the verification readings associated with Day 1 were estimated correctly.

TABLE I

Percentage of verification data estimated correctly using different lookup tables and considering neighbors

| Verification Data | Lookup Table | | | | | |
| --- | --- | --- | --- | --- | --- | --- |
| | Day 1 | Day 2 | Day 3 | Day 4 | Day 5 | Day 6 |
| Day 1 | 93.75 | 81.25 | 84.37 | 87.5  | 90.62 | 90.62 |
| Day 2 | 83.67 | 79.59 | 89.79 | 83.67 | 83.67 | 85.71 |
| Day 3 | 81.81 | 84.84 | 81.81 | 81.81 | 72.72 | 84.84 |
| Day 4 | 77.77 | 74.07 | 81.48 | 85.18 | 77.77 | 70.37 |
| Day 5 | 74.07 | 70.37 | 66.66 | 74.07 | 74.07 | 74.07 |
| Day 6 | 85.71 | 85.71 | 89.28 | 89.28 | 78.57 | 96.42 |

Any single day lookup table results columns of Table I can also be interpreted as the results obtained by prior works since only a single lookup table is used. As seen from Table I, depending on the day the lookup table was built, the percentage of the correct estimates would vary.

Here, the lookup tables for all the six days can be conveniently collected and hence aspects of the present invention store all the six day lookup table as prior tables 204, 205, 206. The average table 2011 is now calculated based on these prior tables 204,205, 206. The performance of the verification data using the average of the six lookup tables is shown in Table II.

TABLE II

Percentage of correct location estimates using various lookup tables

| Verification data | Average result of single day lookup tables | 6 lookup table averages |
| --- | --- | --- |
| Day 1 | 88.02 | 90.63 |
| Day 2 | 84.35 | 87.76 |
| Day 3 | 81.31 | 84.85 |
| Day 4 | 80.77 | 84.62 |
| Day 5 | 72.22 | 77.78 |
| Day 6 | 87.50 | 92.86 |
| All   | 82.36 | 86.41 |

Table II also consists of the average percentage of correct estimates obtained when the same day lookup table is used. The table indicates that improved results may be achieved by using an averaged lookup table instead of any single day lookup table. This also indicates that the results obtained by this scheme are better than the average result obtained by the previous schemes. It should be noted that in prior works similar result may be obtained by manually collecting data on all the six days or installing additional hardware. However in this scheme, data for all the days would be collected using client assistance and hence more efficiently in terms of cost and labor.

Figure 4:
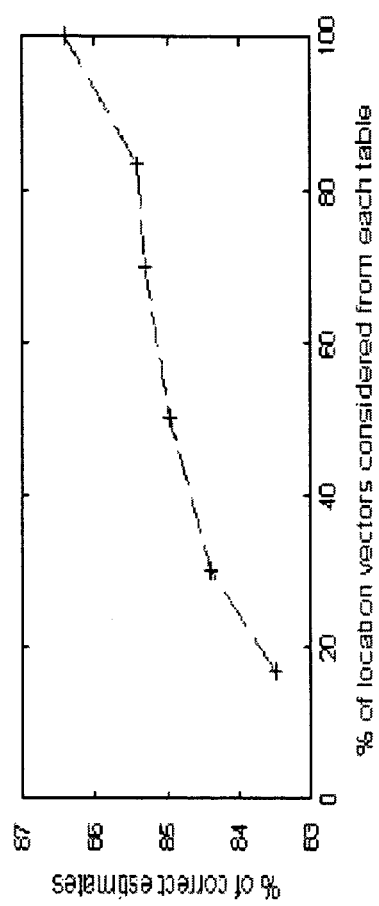
FIG. 4 shows a relationship between correct location estimates and location vectors in accordance with aspects of the present invention.

FIG. 4 shows a percentage of correct location estimates using partially filled average lookup tables.

It should be noted that all the location readings may not be obtained within a given time window resulting in partially filled tables. This may result in incomplete lookup tables with different set of location vectors in the different lookup tables. However, many lookup tables would be stored in prior table, hence the average of these may be considered to contain all the 30 location data. As only a limited time period of data may be considered (for instance, six days), the lookup table from Day 1 may be considered as the average of the prior tables that are not collected in this case. To replicate the scenario of partially completed lookup table only a certain percentage of data points were chosen randomly from the last five Day 2-Day 6 lookup tables. These were averaged with the Day 1 lookup table to form the average lookup table. FIG. 4 shows the percentage of correct estimates when 16.67, 30, 50, 70, 83.33 and 100 percent of location vectors were randomly chosen from each of the five tables.

It should be pointed out that the data was picked randomly from each table to build the average lookup table and the results plotted are obtained by averaging results of ten iterations. FIG. 4 indicates that the results improve as more points are considered for building the lookup table. This also indicates that even with the uncertainty associated with the lookup table of each day, the scheme, on an average, performs better than a single day lookup table.

Figure 5:
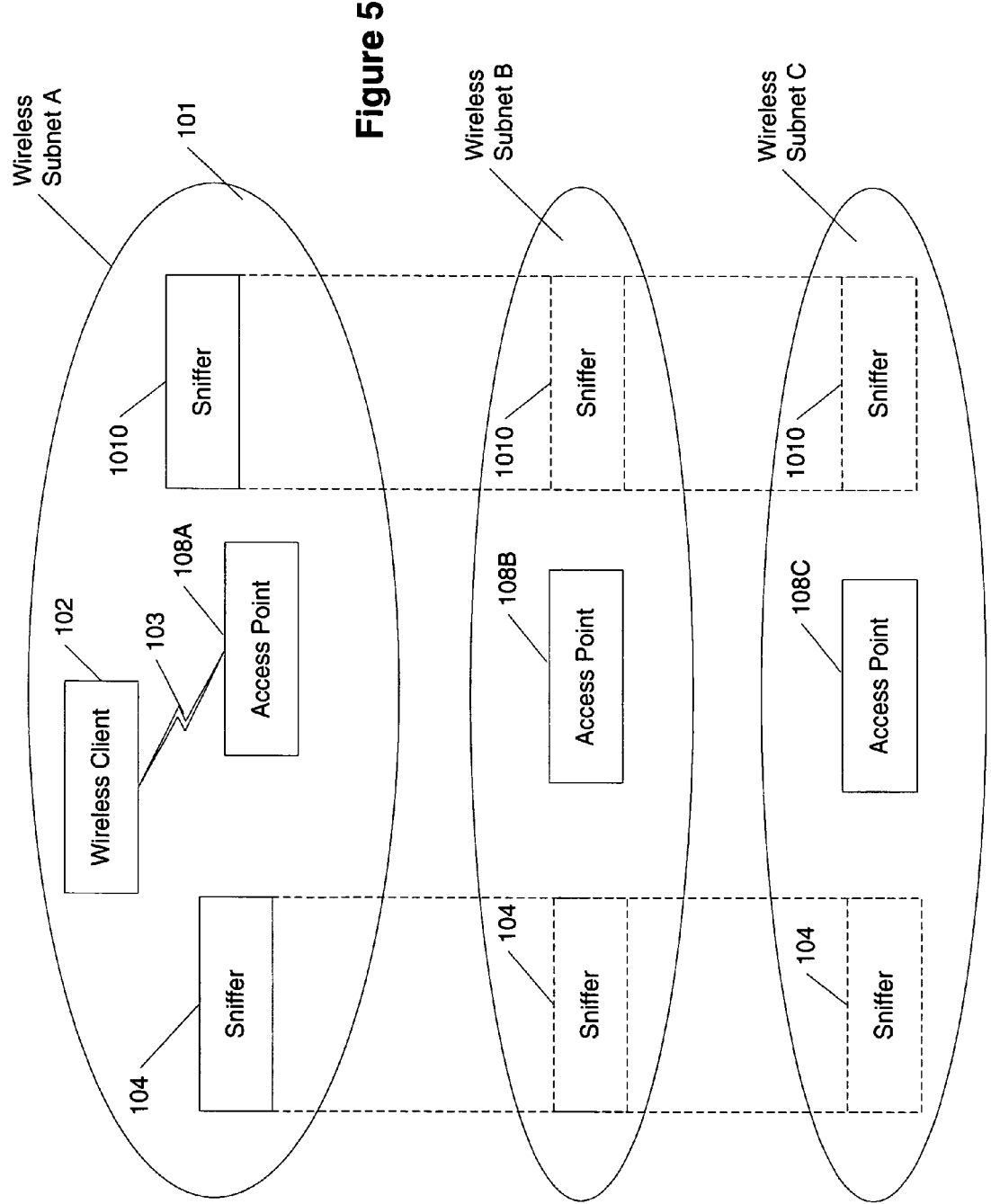
FIG. 5 shows sniffers that exist in various wireless subnets in accordance with aspects of the present invention.

FIG. 5 shows a wireless client 102 in wireless subnet A as being detected by sniffers 104 and 1010. Wireless subnet A is formed by access point 108A. Here, sniffers 104 and 1010 also may detect wireless clients in subnets B and C. Wireless subnets A and B are formed by access points 108B and 108C, respectively. The sniffers 104 and 1010 may include antennas or other systems by which to monitor the other wireless subnets B and C. Alternatively, the sniffers may cycle through the various subnets and determine the locations of the wireless clients on each and then move to the next wireless subnet.

One advantage is that fewer sniffers may be needed to accurately determine the location of wireless clients where multiple subnets intersect.

Figure 6:
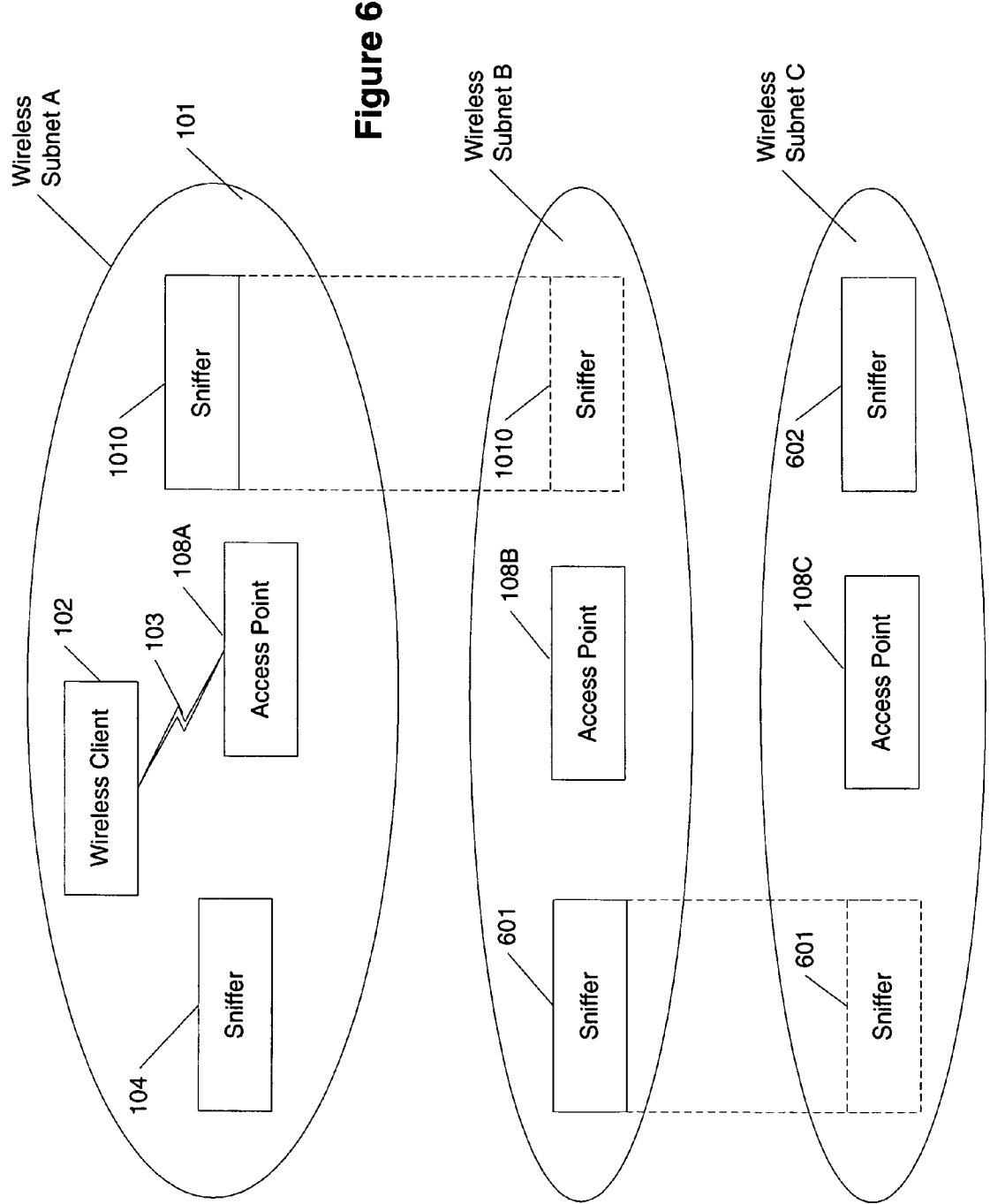
FIG. 6 shows sniffers that do not all exist in the same wireless subnet in accordance with aspects of the present invention.

FIG. 6 shows an alternative type of sniffers to those of FIG. 5. FIG. 6 shows wireless subnets A-C formed by access points 108A-108C, respectively. Here, the sniffers 104 and 1010 do not have access to all subnets A, B, and C. For instance, sniffer 104 only can access wireless subnet A. Sniffer 1010 can only access wireless subnets A and B. Sniffer 601 can access wireless subnets B and C. Sniffer 601 can only access wireless subnet C. Here, the sniffers may be a combination of different hardware including those that can access multiple subnets at the same time or cycle between them and those that can only access one subnet.

The subnets may be separated by channels or by different transmission techniques (802.11a compared to 802.11b or Bluetooth, for instance).

Figure 7:
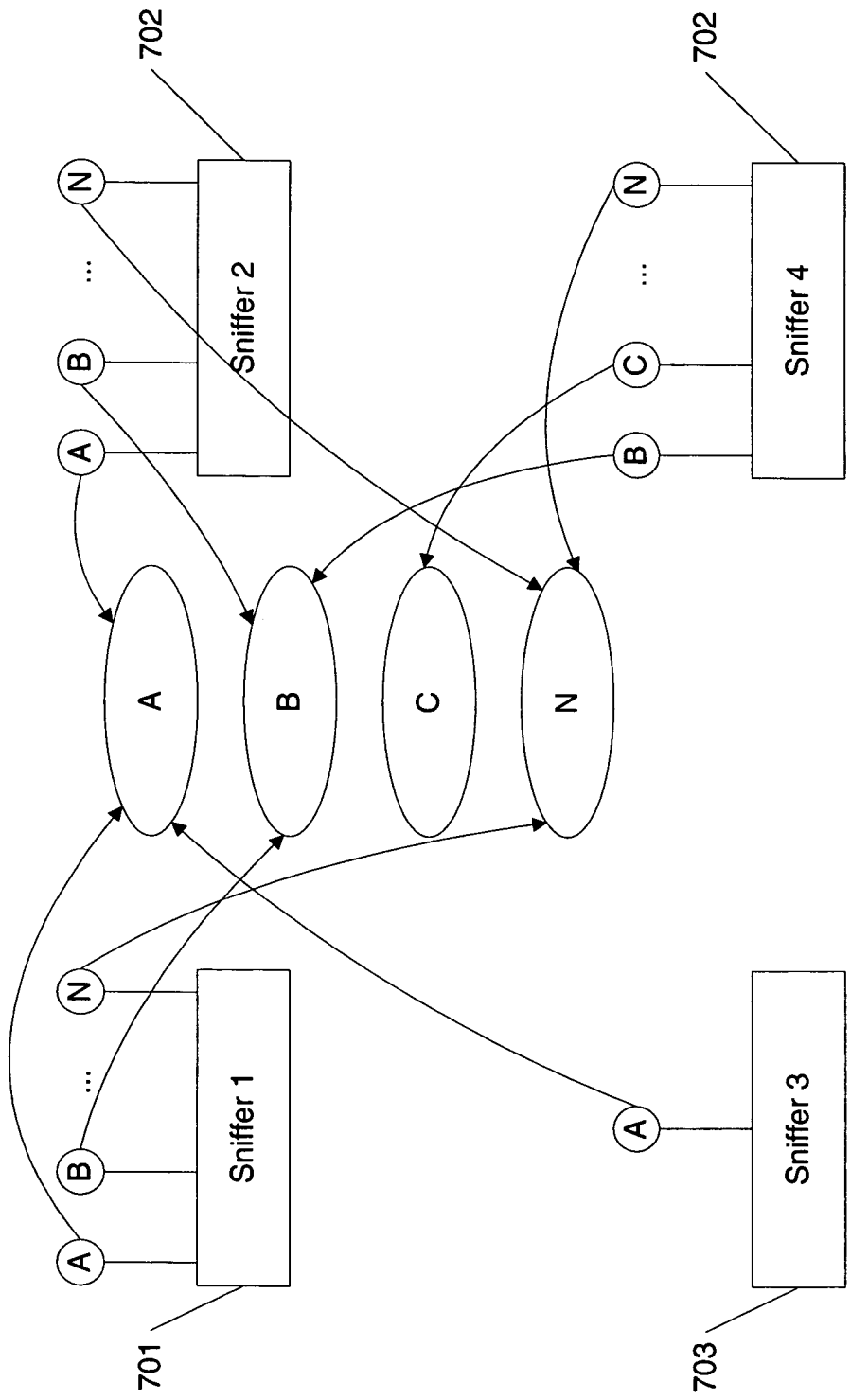
FIG. 7 shows sniffers with various connections to various subnets in accordance with aspects of the present invention.

FIG. 7 shows four sniffers 701-704 connecting to various ones of subnets A, B, C, and N (of course, more or less than four subnets may be used, N is shown to be a variable for the number of additional subnets). Here, sniffer 701 has antennas or can cycle through to connect to subnets A, B, and N. Sniffer 702 has antennas or can cycle through to connect to subnets A, B, and N. Sniffer 703 has an antenna or can cycle through to connect to subnet A. Sniffer 704 has antenna or can cycle through to connect to subnets B, C, and N.

Figure 8:
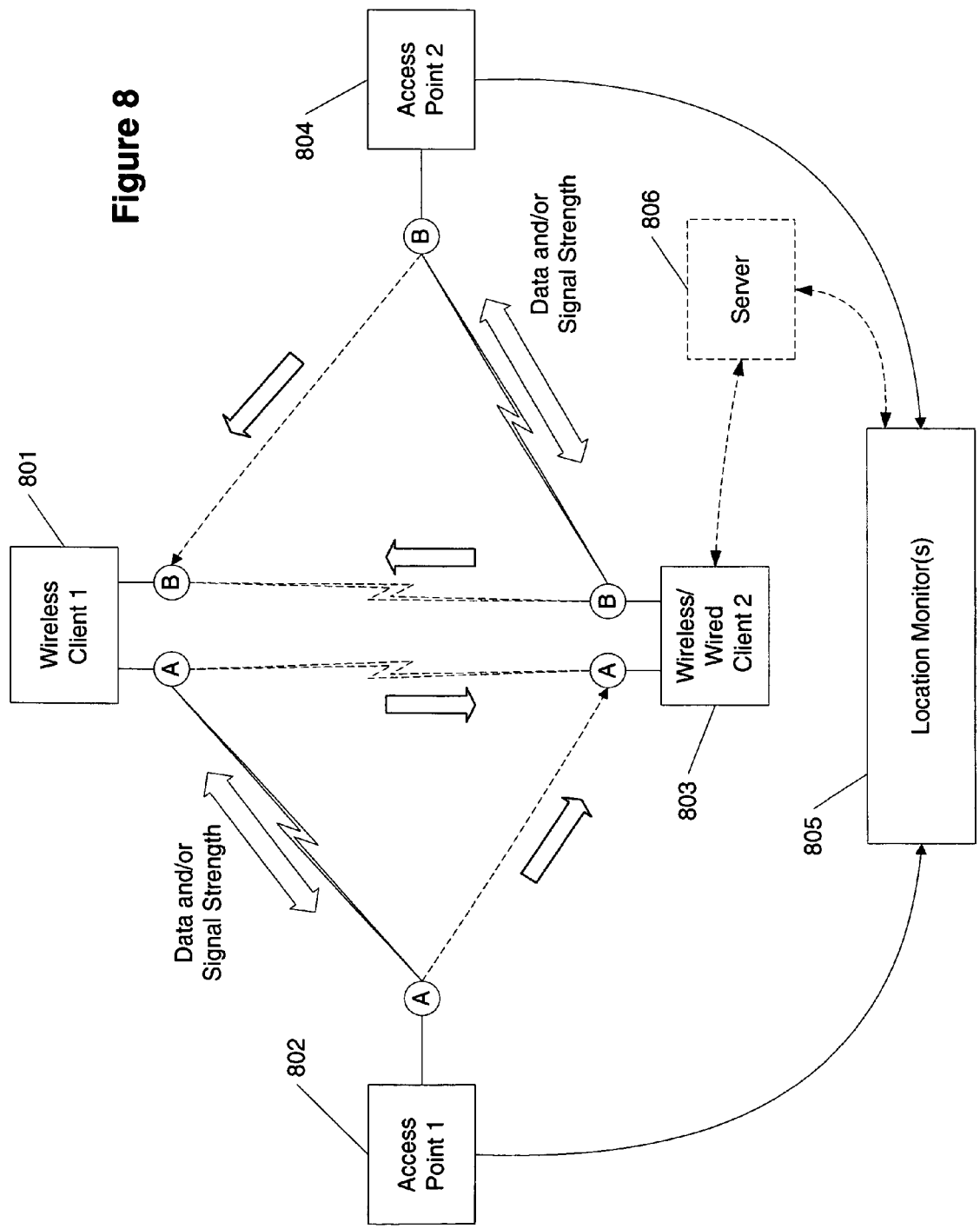
FIG. 8 shows wireless clients monitoring other wireless clients and reporting the other wireless clients' locations to their wireless access point or points in accordance with aspects of the present invention.

FIG. 8 shows an alternative process in which wireless clients 1 801 and 2 803 are connected to different networks A and B, respectively. Each network has its own access point (access point 1 802 for network A and access point 2 804 for network B). Wireless client 801 includes an antenna that detects the signal strength of wireless client 2 803 using network B. The information determined from the signal strength is transmitted over the pathway created between wireless client 1 801 and access point 1 802 for relaying to a database as shown in FIG. 2. Similarly, wireless client 2 803 includes an antenna that sniffs the signals coming from wireless client 801 on network A and transmits information relating to the signal strength of packets coming from wireless client 1 801 to access point 2 804 along the pathway between access point 2 804 and wireless client 2 803. The information may then be forwarded to a database as shown in FIG. 2. Here, one advantage is that wireless clients 1 and 2 may be sniffers themselves for other wireless clients, thereby increasing the number of sniffers for any given area.

The access points 1 802 and 2 804 may monitor the data and/or signal strength from one or more of the clients 801, 803. The signal strength may then be forwarded to one or more location monitors 805 that determine the locations of the clients.

FIG. 8 also shows optional data communication pathways from access point 1 802 to client 2 803 and from access point 2 804 to client 1 801. For instance, access points 1 802 and 2 804 may communicate with the clients via Bluetooth, Wi-Fi, CDMA, TDMA, Bluetooth, or by using a wired connection.

Further, client 2 803 may be a wired or wireless client. If client 2 803 is a wired client, then it may communicate with a network node (for instance a server 806). The network node 806 may then forward sensed signal strength to location monitor(s) 805.

Figure 9:
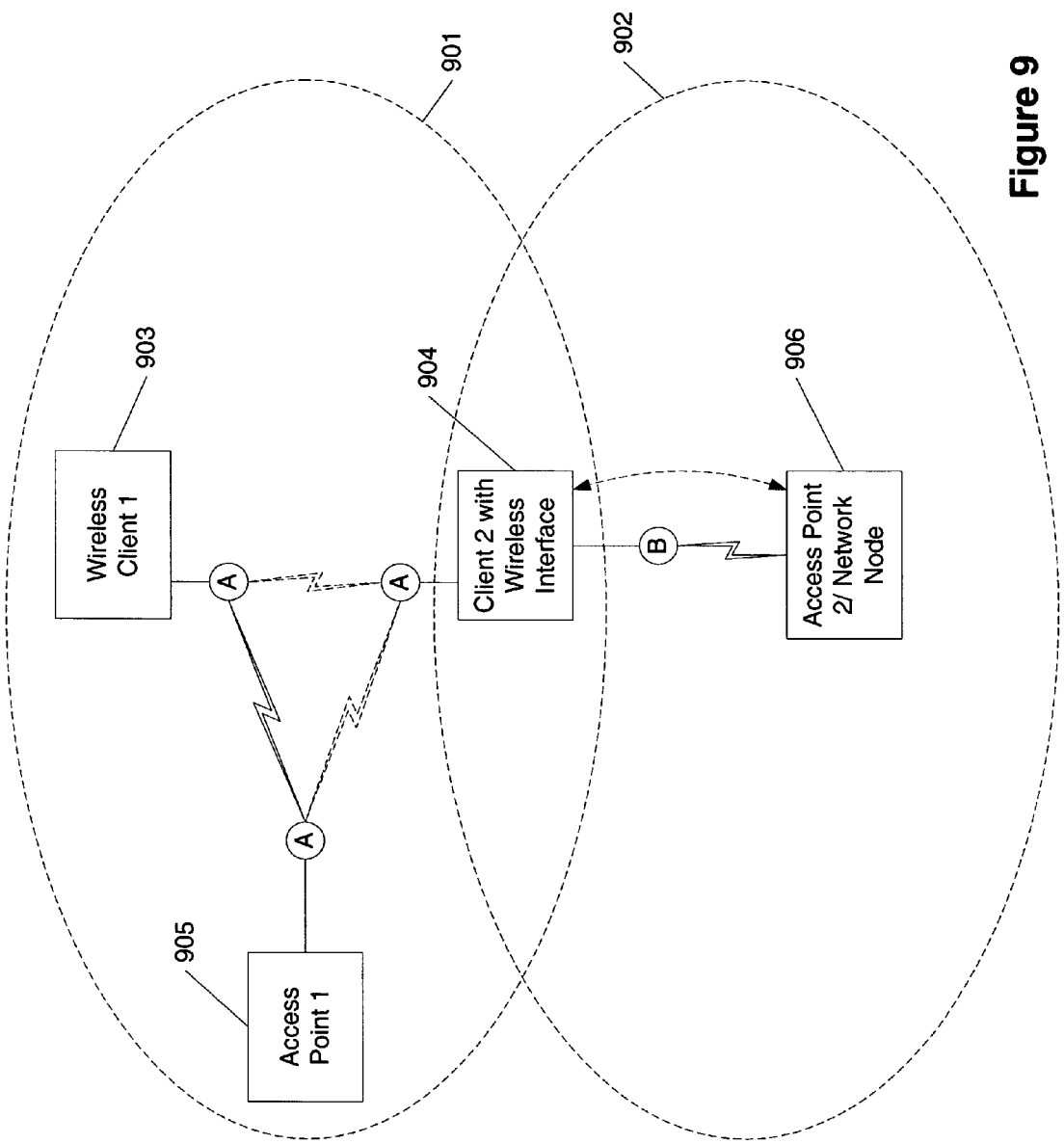
FIG. 9 shows a variation on the approach of FIG. 8 in accordance with aspects of the present invention.

FIG. 9 shows yet another alternative approach to wireless clients acting as sniffers. Here, two wireless subnets are shown: 901 and 902. Wireless client 1 902 has a single antenna that connects to subnet 901 using access point 1 905. Client 2 904 also has an antenna that connects to access point 1 in subnet 901. Client 2 904 may include another antenna that allow it to connect to wireless subnet 902. Alternative, wireless client 2 may cycle between connections to subnet 901 and to subnet 902, using a single antenna. Further, client 2 904 may include a wired interface that allows client 2 904 to communicate with network node 906 (access point 2). In short, it is appreciated that the connection between client 2 904 and access point 2/network node 906 may be any type of connection (wired, wireless, a combination of wired and wireless, and the like).

Here, wireless client 904 sniffs signal strength information from wireless client 903 and provides it to access point (or network node) 906 in subnet 902, for relaying to a database as shown in FIG. 2 for location determination of wireless client 1 903. An advantage for the approach shown in FIG. 9 is that wireless clients that have the ability to cycle between or connect to two different subnets can still provide location determination information about other wireless clients that cannot provide this type of information.

Figure 10:
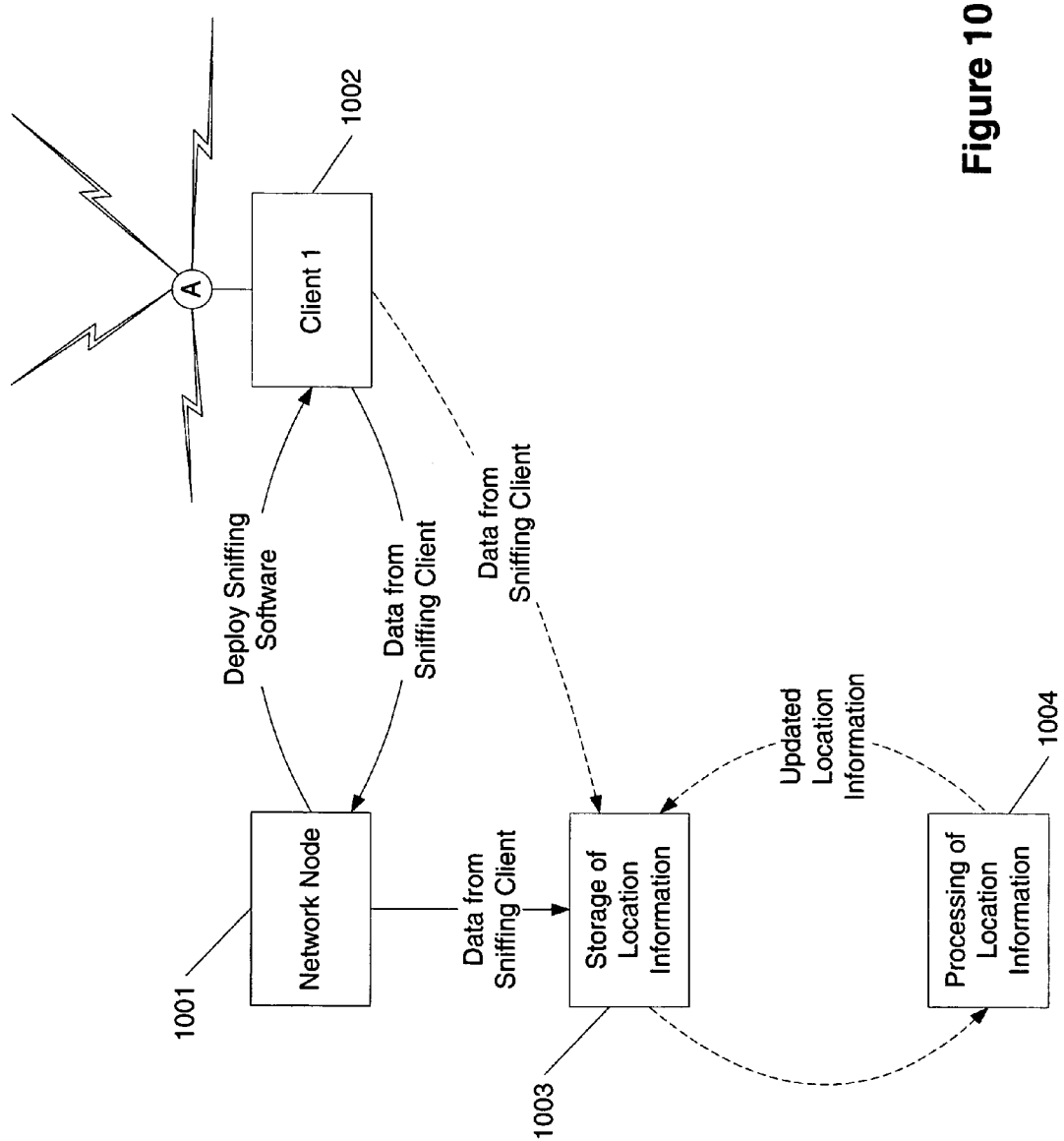
FIG. 10 shows a client forwarding sniffing data to a storage in accordance with aspects of the present invention.

The process by which a global monitor determines the location of a wireless client may be based on signal strength tables as described above. FIG. 10 shows one possible way to construct these tables. Here, a network node 1001 deploys sniffing software to a client 1 1002. The client 1 1002 may be a wireless computer or a wired computer on a cart or handheld processing device or the like. Further, client 1 1002 may be a desktop computer with a wireless interface. Client 1 1002 may be moved to various locations, the locations recorded and the signal strength of access points recorded. Alternatively, if client 1 1002 is a fixed desktop, its location may be noted and the signal strength information recorded as well. The data (position information and signal strength information) from the client 1 1002 may then be returned to network node 1001. The client 1 may only gather and return information once or may do so on a regular basis to account for new network nodes, access points, or activities (including rearrangement of physical structures that may influence the reception of wireless signals from other clients or access points).

The network node 1001 may then forward the data to storage 1003. Storage 1003 stores the location information from one or more clients. The new information regarding location information and monitored signal strengths may then be processed in step 1004. This processing updates the stored tables as described above.

Figure 11:
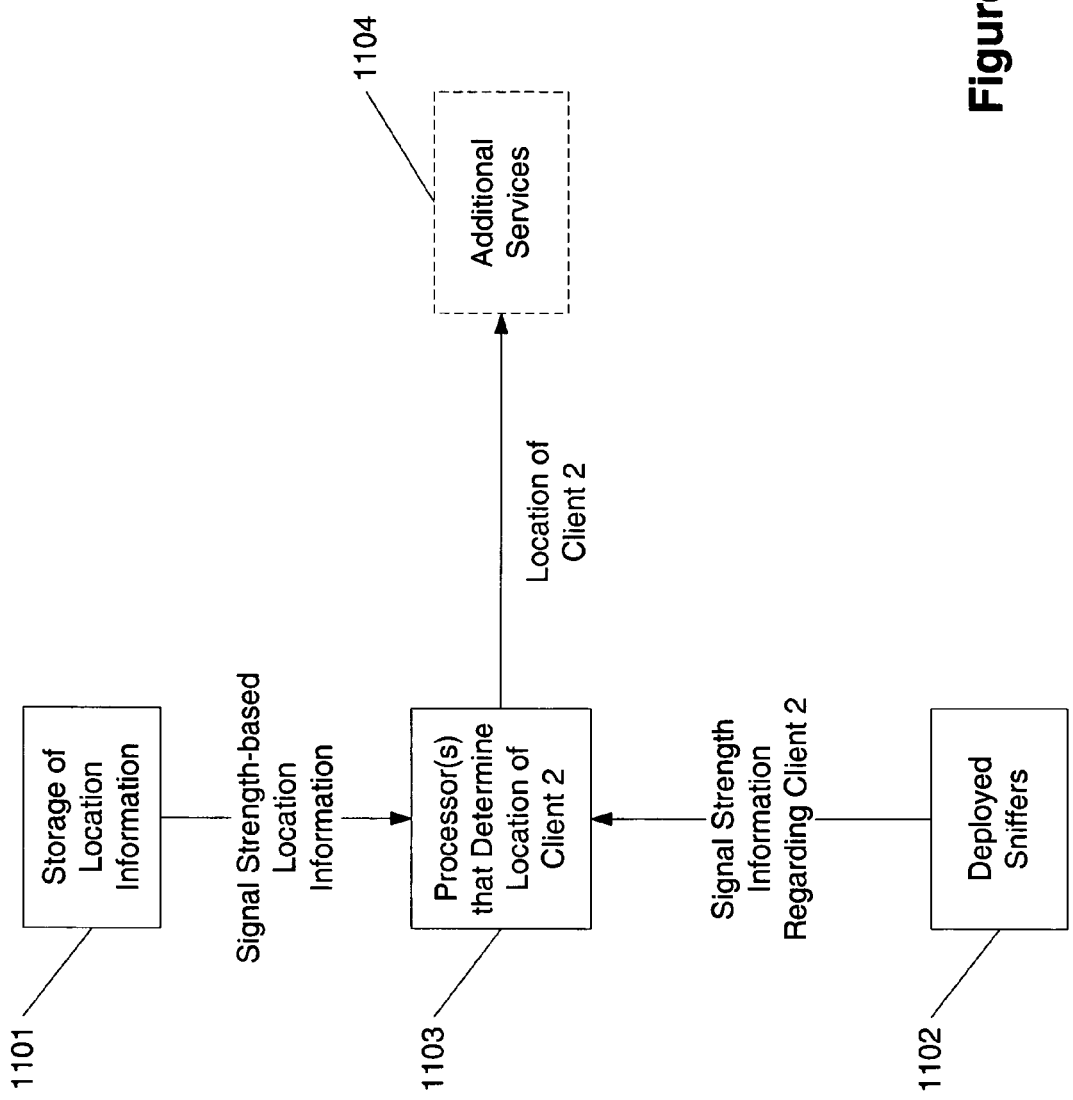
FIG. 11 shows a process for determining the location of a client in accordance with aspects of the present invention.

FIG. 11 shows an illustrative example of how the location of a client may be determined. Storage 1101 may include location information as relating to signal-strength information as previously gathered. Deployed sniffers 1102 sniff signal strength information regarding a client 2. The signal strength information from deployed sniffers 1102 is then sent to processor(s) 1103. Processor (or processors) 1103 attempt to correlate the signal strength information from deployed sniffers 1102 with the signal strength-based location information from storage 1101. Processor (or processors) 1103 then output the location of client 2. For instance, the processor (or processors) 1103 may output the location of client 2 back to client 2 or to other entities or to additional services 1104.

With respect to aspects of the present invention, the cost of localization is less than the previous methods which collect data either manually or by installing additional hardware.

Since the data collection process is automated, frequent data can be collected to account for the time varying nature of the signal strength in the wireless environment. This would be difficult in previous methods suggesting manual data collection. The data obtained would be the actual signal strength and hence would be more accurate than the schemes calibrating signal strengths based on previous readings and few current measurements.

The security policies may also be implemented using the client agent 305 program.

Aspects of the present invention may be provided in a localization service for enterprises to locate various wireless users. They may also be used to implement location based security policies to access the network.

Entities that implement location services for various enterprise may use the approaches described herein. For example, a private medical research center may be interested in restricting wireless access based on user privileges and access location. It may approach companies with expertise in wireless security such as including but not limited to Cisco, IBM, Telcordia, and Avaya Labs in order to implement such a scheme.

Aspects of the present invention include the processes described above being stored on a computer-readable medium in the form of a computer-implemented program. The medium may take various forms as known in the art including static memory, dynamic memory, portable and fixed.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A system for building location vectors using a client-assisted data collection scheme, comprising:
 a first wireless client having client agent software;
 an access point providing a first wireless subnet in which the first wireless client is connected to said access point;
 at least two additional wireless clients, each of the at least two additional wireless clients acting as sniffers that receive data packets from the first wireless client and detect a signal strength associated with said data packets, wherein the at least two additional wireless clients are further configured to monitor a surrounding wireless environment and passively record a signal strength of one or more packets originating from one or more wireless clients in the vicinity of the at least two wireless clients;
 a database that receives and stores signal strength information from the at least two additional wireless clients and corresponding location information associated with the signal strength; and a global monitor that is configured to determine locations of other wireless clients in the first wireless subnet based on the signal strength information stored in the database, wherein the global monitor maintains the database that receives and stores the signal strength information, wherein the global monitor is configured to initiate a client-assisted data collection process to build at least one location vector for the database by querying the first wireless client for its location, wherein the client agent software on the first wireless client is configured to request a user of the first wireless client to enter a current location of the first wireless client when queried by the global monitor, and is further configured to notify the global monitor of the current location of the first wireless client based on input received from the user of the first wireless client, wherein the global monitor is configured to request the at least two additional wireless clients to monitor signal strength of the first wireless client after receiving the current location of the first wireless client from the client agent software on the first wireless client, wherein the at least two additional wireless clients are configured to monitor the signal strength of the first wireless client when requested by the global monitor and provide a reading of the signal strength of the first wireless client to the global monitor, and wherein the global monitor is configured to update the database after receiving the reading from the at least two additional wireless clients.

2. The system according to claim 1, wherein the location of each of the at least two additional wireless clients is known based on input information.

3. The system according to claim 1, wherein the location of each of the at least two additional wireless clients is known through use of GPS.

4. The system according to claim 1, wherein the location of each of the at least two additional wireless clients is known through use of other wireless clients.

5. The system according to claim 1, wherein the database receives the signal strength information from the at least two additional wireless clients on a periodic basis.

* * * * *

UNITED STATES PATENT AND TRADEMARK OFFICE
CERTIFICATE OF CORRECTION

PATENT NO.        : 9,046,595 B2
APPLICATION NO.   : 11/514312
DATED             : June 2, 2015
INVENTOR(S)       : Anjum et al.

It is certified that error appears in the above-identified patent and that said Letters Patent is hereby corrected as shown below:

ON THE TITLE PAGE

On Page 2, in Item (56), under "OTHER PUBLICATIONS", in Column 2, Line 5, delete "vo. 10," and insert -- vol. 10, --, therefor.

On Page 2, in Item (56), under "OTHER PUBLICATIONS", in Column 2, Line 20, delete "vol." and insert -- vol. 1, --, therefor.

IN THE DRAWINGS

In Fig. 6, Sheet 7 of 12, delete " 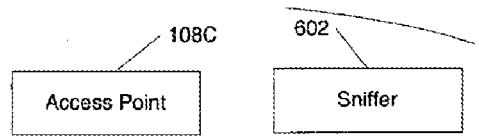 " and insert -- 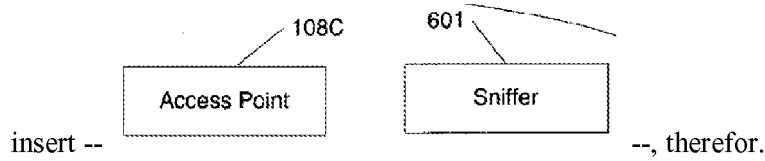 --, therefor.

In Fig. 7, Sheet 8 of 12, delete " 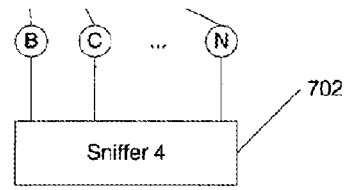 " and

Signed and Sealed this
Twenty-fourth Day of November, 2015

Michelle K. Lee
*Director of the United States Patent and Trademark Office* insert -- 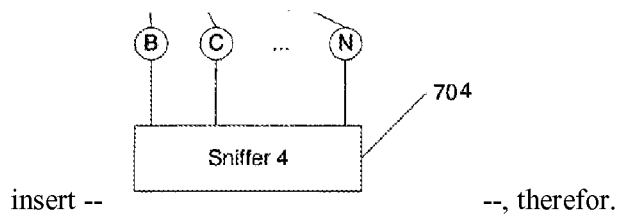 --, therefor.
IN THE SPECIFICATION
In Column 9, Line 31, delete "client 904" and insert -- client 2 904 --, therefor.